US010149526B2

(12) United States Patent
Nagao

(10) Patent No.: US 10,149,526 B2
(45) Date of Patent: Dec. 11, 2018

(54) DRAWING DEVICE, OPERATION CONTROLLING METHOD OF DRAWING DEVICE, AND OPERATION CONTROLLING PROGRAM OF DRAWING DEVICE

(71) Applicant: CASIO COMPUTER CO., LTD., Shibuya-ku, Tokyo (JP)

(72) Inventor: Tomoyuki Nagao, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 553 days.

(21) Appl. No.: 14/980,843

(22) Filed: Dec. 28, 2015

(65) Prior Publication Data
US 2016/0183657 A1 Jun. 30, 2016

(30) Foreign Application Priority Data

Dec. 25, 2014 (JP) ................. 2014-261642

(51) Int. Cl.
G06T 5/00 (2006.01)
A45D 29/00 (2006.01)
G06K 9/00 (2006.01)

(52) U.S. Cl.
CPC ......... A45D 29/00 (2013.01); G06K 9/00375 (2013.01); A45D 2029/005 (2013.01)

(58) Field of Classification Search
None
See application file for complete search history.

(56) References Cited

U.S. PATENT DOCUMENTS

| 6,286,517 | B1* | 9/2001 | Weber | A45D 29/00 132/200 |
| 6,525,724 | B1* | 2/2003 | Takami | A45D 29/00 345/418 |
| 2010/0252058 | A1* | 10/2010 | Rehkemper | A45D 29/00 132/73 |
| 2016/0000204 | A1* | 1/2016 | Yamasaki | A45D 29/00 132/200 |
| 2016/0088918 | A1* | 3/2016 | Nagao | A45D 29/00 132/200 |

FOREIGN PATENT DOCUMENTS

JP 2003534083 A 11/2003

* cited by examiner

Primary Examiner — Ted Barnes
(74) Attorney, Agent, or Firm — Holtz, Holtz & Volek PC

(57) ABSTRACT

A drawing device includes: an object placing part on which an object is placed, the object being a finger or a toe having a nail; a direction detection unit configured to detect an extended direction of a streaky pattern naturally-existing on a surface of the nail based on the image including the nail of the object placed on the object placing unit; an image processing unit configured to adjust a direction of a nail design based on the extended direction of the streaky pattern detected by the direction detection unit; and a nail design forming unit configured to form the nail design which is adjusted by the image processing unit on the nail.

16 Claims, 14 Drawing Sheets

FIG. 7A
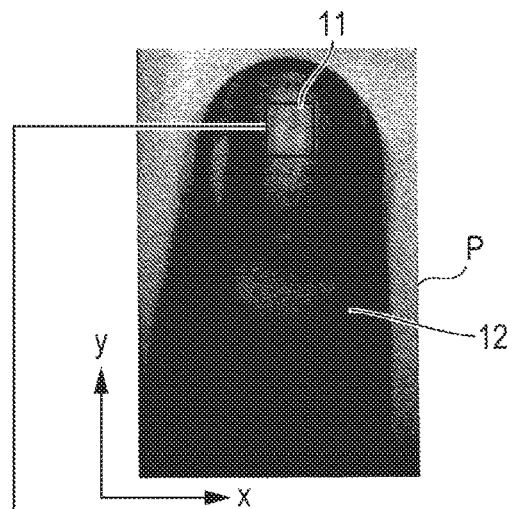
FIG. 7B
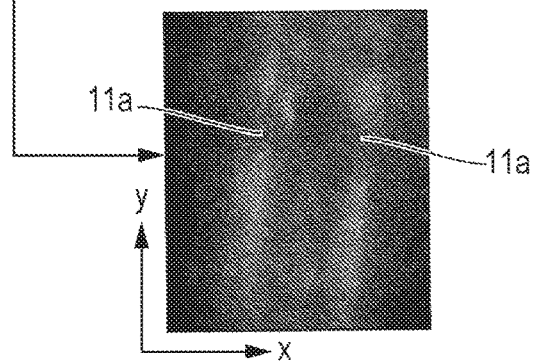
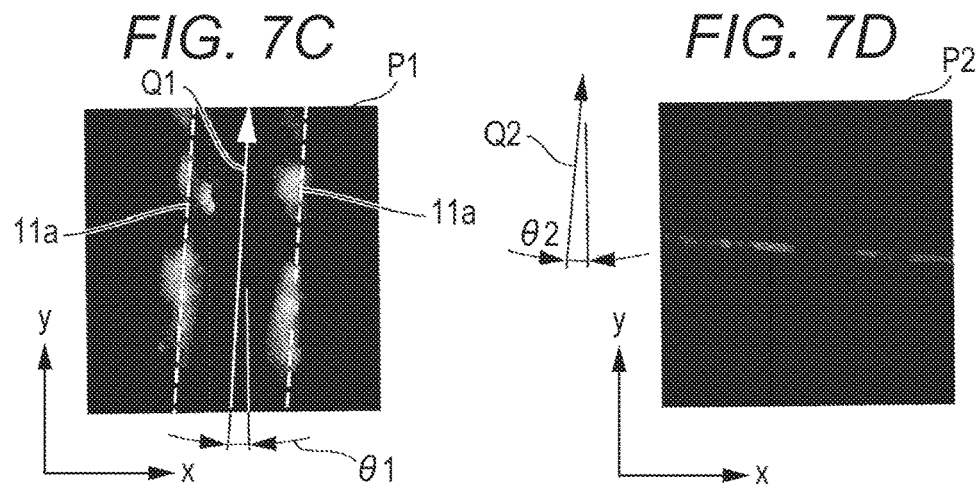
FIG. 7C
FIG. 7D

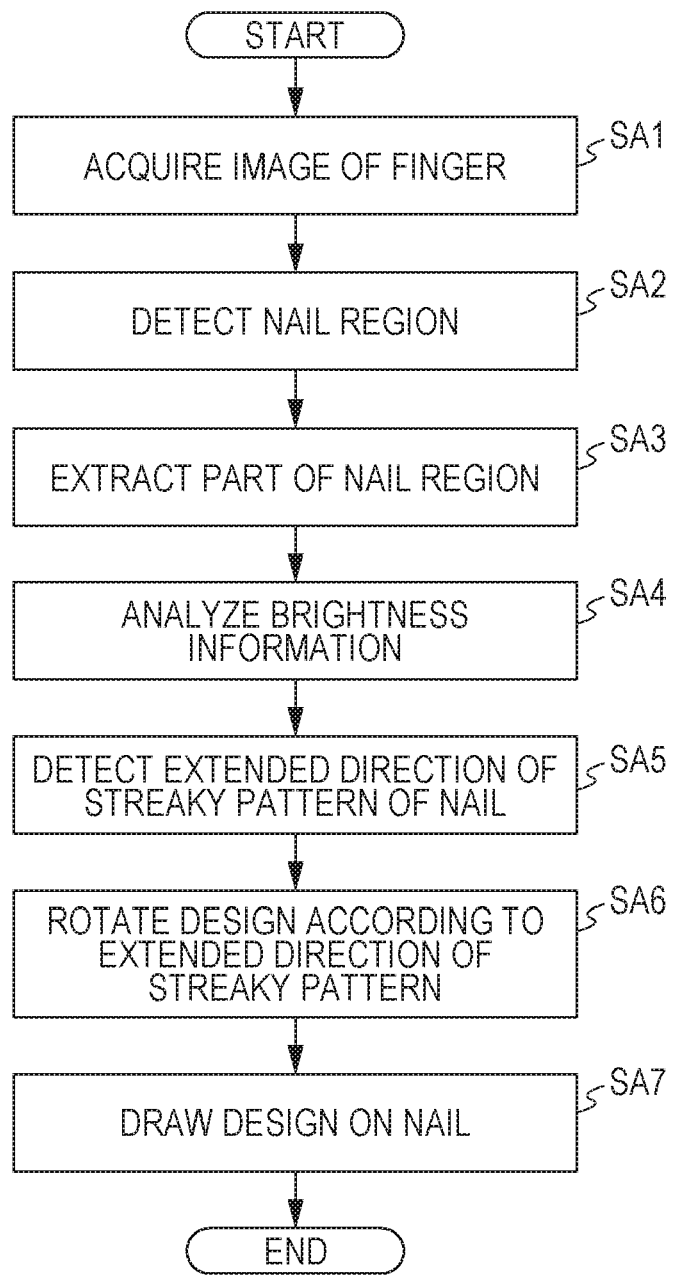

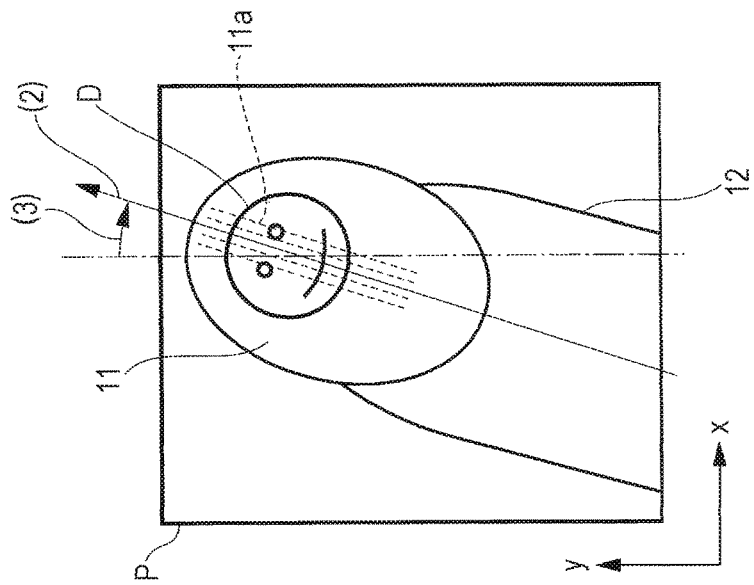
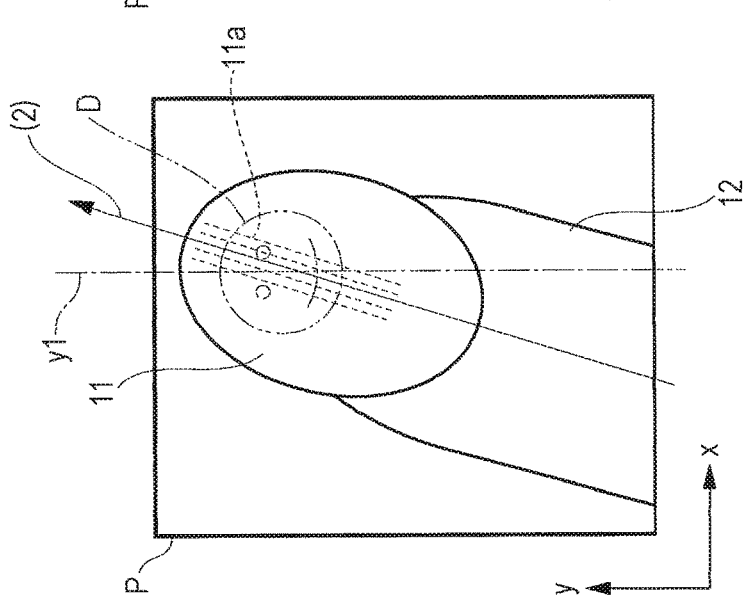
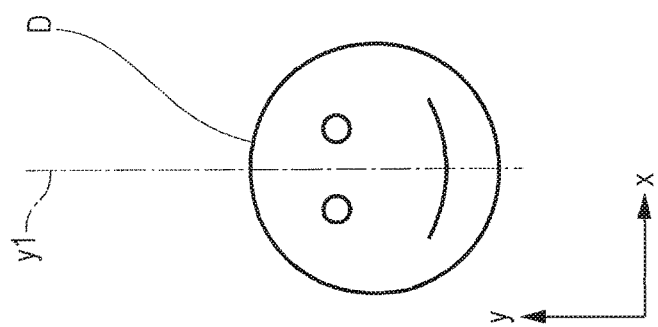

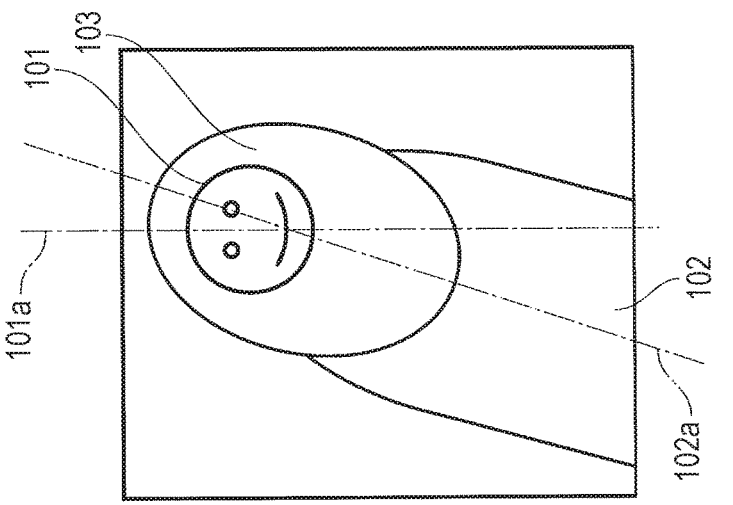
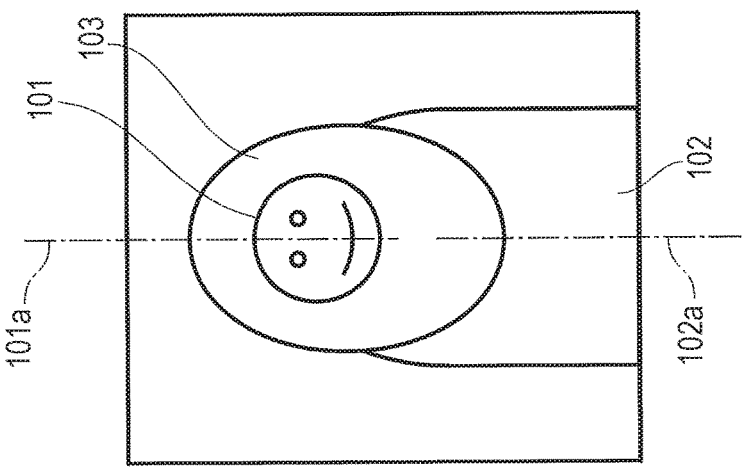
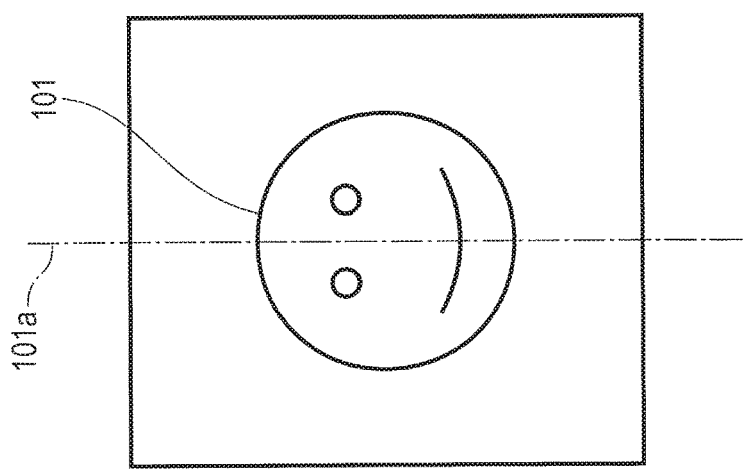

DRAWING DEVICE, OPERATION CONTROLLING METHOD OF DRAWING DEVICE, AND OPERATION CONTROLLING PROGRAM OF DRAWING DEVICE

CROSS-REFERENCE TO RELATED APPLICATIONS

Corresponding Japanese Application
Application Number: Patent Application Number 2014-261642, Date of Application: Dec. 25, 2014

BACKGROUND OF THE INVENTION

1. Field of the Invention

An embodiment of the present invention relates to a drawing device, an operation controlling method of the drawing device, and an operation controlling program of the drawing device.

2. Description of the Related Art

In a related art, a drawing device to draw a nail design on a nail of a finger has been proposed.

For example, in JP 2003-534083 W, a technology to draw a nail design on a nail of a finger or toe by using an ink jet printing technology has been described. In a drawing device of this type, an image of a finger on which drawing is to be performed is acquired with a camera and a nail region is detected from the acquired image. In this detection, it is necessary to know a direction of the nail in addition to the nail region.

This is because a finger of a nail on which drawing is to be performed is not always inserted in a preferred angle with respect to a finger placed table of a drawing device. Here, FIGS. 14A to 14C are views for describing a technology of a related art. As illustrated in FIG. 14A, for example, a case where there is a nail design 101 and the nail design 101 is drawn on a nail 103 of a finger 102 is considered.

As illustrated in FIG. 14B, when the finger 102 is inserted straight with respect to the finger placed table, the nail design 101 can be drawn correctly (in state in which longitudinal direction (axis) 102a of finger 102 is identical to direction of axis 101a in vertical direction of nail design 101).

However, as illustrated in FIG. 14C, when the finger 102 is inserted obliquely with respect to the finger placed table, the nail design 101 is drawn obliquely on the nail 103.

In order to prevent the nail design 101 from being drawn obliquely on the nail 103 in such a manner, it is necessary to check the longitudinal direction 102a of the finger 102 based on a shape of the finger 102 before drawing the nail design 101 and to make a correction in order to make the axis 101a in the vertical direction of the nail design 101 becomes identical to the longitudinal direction 102a of the finger 102.

However, there is a case where a shape of the finger 102 is not symmetrical. Thus, there is a case where it is difficult to determine a longitudinal direction of the nail 103 based only on the shape of the finger 102.

BRIEF SUMMARY OF THE INVENTION

An embodiment of the present invention can provide a drawing device which can draw a nail design on a nail of a finger while appropriately adjusting a direction of the nail design regardless of a shape of the finger, an operation controlling method of the drawing device, and an operation controlling program of the drawing device.

According to an embodiment of the present invention, there is provided a drawing device including: an object placing part on which an object is placed, the object being a finger or a toe having a nail; a nail design forming unit configured to form a design on the nail; and a control unit, wherein the control unit including: a direction detection unit configured to detect an extended direction of a streaky pattern which is naturally-existing on the nail based on an image including the nail of the object placed on the object placing part; and an image processing unit configured to adjust a direction of a nail design based on the extended direction of the streaky pattern detected by the direction detection unit, wherein the nail design forming unit forms the nail design which is adjusted by the image processing unit, as the design, on the nail.

According to another embodiment of the present invention, there is provided an operation controlling method of a drawing device, including: a first detecting step of detecting an extended direction of a streaky pattern naturally-existing on a nail of an object which is placed on an object placing part, the object being a finger or a toe having the nail; a first adjusting step of adjusting a direction of a nail design based on the extended direction of the streaky pattern detected in the first detecting step; and a design forming step of forming the nail design which is adjusted in the first adjusting step on the nail.

According to another embodiment of the present invention, there is provided a non-transitory computer-readable recording medium recording an operation controlling program of a drawing device, the operation controlling program causing a computer: to detect an extended direction of a streaky pattern naturally-existing on a nail of an object which is placed into an object placing part, the object being a finger or a toe having the nail, based on an image including the nail of the object acquired by an image acquiring unit, to adjust a direction of a nail design based on the extended direction of the streaky pattern, and to form the nail design which is adjusted on the nail with a nail design forming unit.

BRIEF DESCRIPTION OF THE SEVERAL VIEWS OF THE DRAWING

FIGS. 7A to 7D are views for describing a function of the direction detection unit according to the embodiment and are views illustrating images of when a finger is inserted obliquely, FIG. 7A being a view illustrating an acquired image, FIG. 7B being a view illustrating a part of an image extracted from FIG. 7A, FIG. 7C being a view illustrating an image on which conversion into a grayscale and enhancement processing are performed, and FIG. 7D being a view illustrating a power spectrum image which is acquired by two-dimensional Fourier transform of an image;

FIG. 8 is a flowchart of a first example of an operation controlling method according to the embodiment;

FIG. 9A is a plan view of a design; FIG. 9B is a view illustrating an image of in a case where a nail is inserted obliquely; FIG. 9C is a view illustrating a state in which a design is inclined according to an extended direction of a streaky pattern;

FIGS. 14A to 14C are view for describing a technology of a related art, FIG. 14A being a view illustrating a nail design, FIG. 14B being a view of in a case where a finger is inserted straight, and FIG. 14C being a view of in a case where a finger is inserted obliquely.

DETAILED DESCRIPTION OF THE INVENTION

Figure 1:
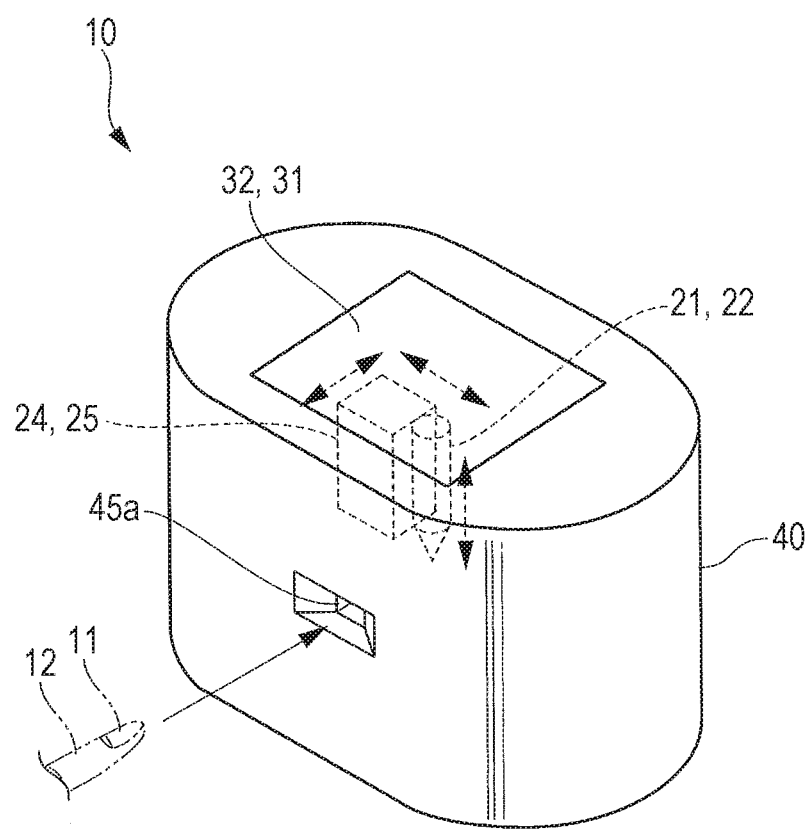
FIG. 1 is a perspective view illustrating an outer appearance of a drawing device according to an embodiment of the present invention.

In the following, an embodiment of a drawing device to which a nail information detecting device according to the present invention is applied will be described in detail with reference to the drawings.

Note that in the embodiment described in the following, various kinds of limitation which is technically preferable to execute the present invention are assigned. However, the scope of the present invention is not limited to the following embodiment or illustrated examples.

Here, it is assumed that the drawings are to be seen in a direction of signs. Note that the same number is assigned to identical elements in the entire description of the embodiment.

In the following embodiment, a description will be made on the assumption that a drawing device performs drawing with a finger having a nail as an object and a surface of the nail of the finger as a surface to be an object of drawing. However, a surface to be an object of drawing of the present invention is not limited to a surface of a nail of a finger. For example, with a toe having a nail as an object, drawing may be performed on a surface of the nail of the toe as the surface to be an object of drawing.

Configuration of Embodiment

A basic configuration of the drawing device will be described with reference to FIG. 1 and FIG. 2.

FIG. 1 is a view schematically illustrating an outer appearance of the drawing device. FIG. 2 is a plan view of a display unit.

As illustrated in FIG. 1, the drawing device 10 is a device which includes, for example, a drawing function by a printing unit 24 and a drawing function by a drawing unit 21 and which draws a nail design D (see FIG. 2) on a nail 11 of a finger 12 of a person by combining these.

The drawing device 10 includes a main case 40, the drawing unit 21 and the printing unit 24 which are provided inside the main case 40, a display unit 32 provided on an upper surface (top board) of the main case 40, and an opening for finger insertion 45a opened in a front surface of the main case 40.

Here, the drawing unit 21 and the printing unit 24 correspond to a nail design forming unit in the present invention.

The opening for finger insertion 45a receives a finger 12 corresponding to a nail 11 on which a design is drawn.

In the main case 40, a control device 51 (see FIG. 3) and an image acquiring unit 46 (see FIG. 3) are housed.

Figure 2:
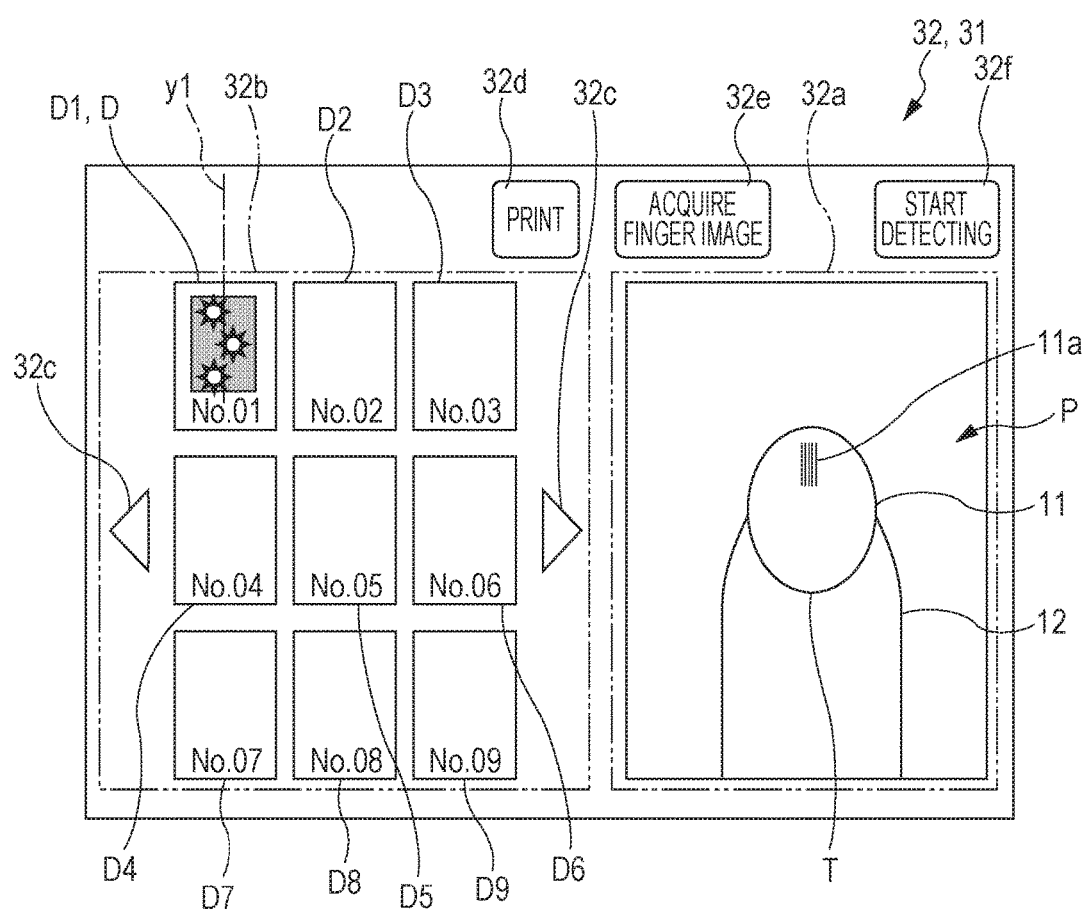
FIG. 2 is a plan view of a display unit according to the embodiment.

As illustrated in FIG. 2, the display unit 32 is one of various flat displays such as a liquid crystal display and an organic electroluminescence display.

The display unit 32 is a touch panel-type which also functions as an operating unit 31. For example, an instruction from a user can be input by touch operation to touch a surface of the display unit 32 with a fingertip, a stylus pen, or a stick-type writing material with a sharp end.

On one of right and left sides of the display unit 32 (right side in this example), a design confirmation part 32a with which it is possible to confirm an image P, which is a photographed finger 12, and a nail region T (image of outline of nail 11 or the like) included in the image P is provided.

On the other hand, on the other side of the right and left sides of the display unit 32 (left side in this example), a design selection part 32b on which a plurality of nail designs D1 to D9 (detail design of nail design D2 to D9 is not illustrated) is displayed is provided.

Note that in the following description, in a case of generally referring to the plurality of nail designs D1, D2, D3 . . . , the numbers are omitted and the nail designs will be described as a "nail design D."

In the design selection part 32b, it is possible to select a nail design D to be drawn on the nail 11 with touch operation among the plurality of displayed nail designs D.

By pressing triangle buttons 32c provided on right and left sides of the design confirmation part 32a, it is possible to display a different nail design D which is not displayed on the design confirmation part 32a.

Moreover, in the display unit 32, a print button 32d to start printing on the nail 11, an image acquiring button 32e to acquire the image P, and a detection starting button 32f to start detecting a nail region (outline of nail 11) T in the finger 12 are provided.

Then, a configuration of control of the drawing device 10 will be described with reference to FIGS. 3 to 6D.

Figure 3:
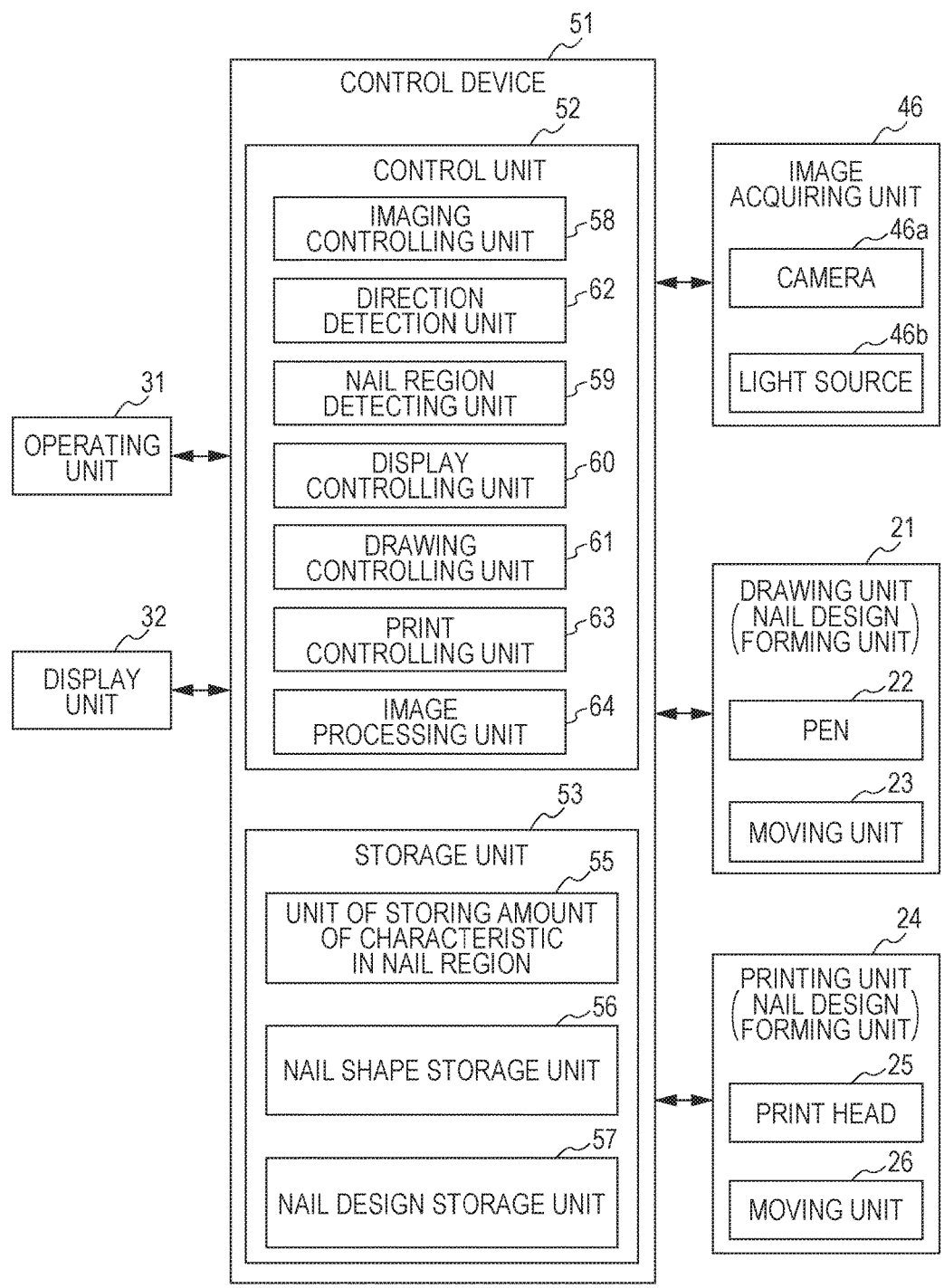
FIG. 3 is a block diagram illustrating a configuration of control according to the embodiment.
Figure 4:
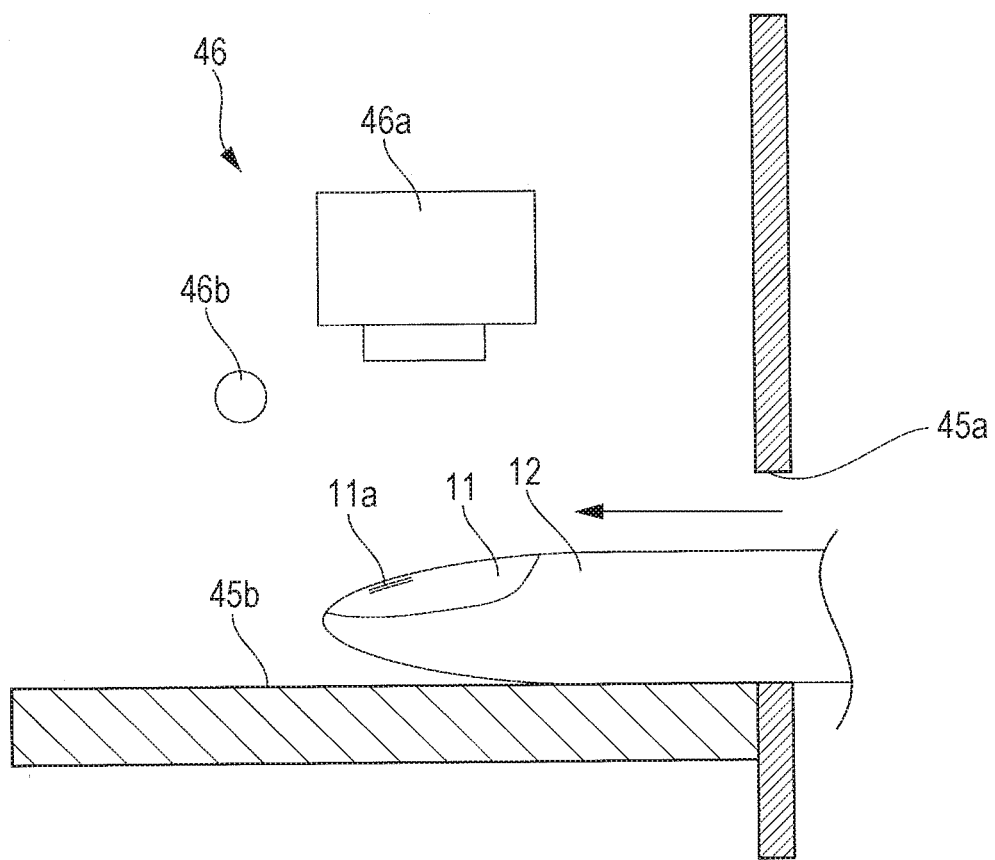
FIG. 4 is a view schematically illustrating a side cross section around an opening for finger insertion according to the embodiment.

FIG. 3 is a block diagram illustrating a configuration of the control. FIG. 4 is a view schematically illustrating a side cross section around the opening for finger insertion. FIGS. 5A to 5F are views for describing arrangements of a light source. FIGS. 6A to 6D are views for describing a function of the direction detection unit.

As illustrated in FIG. 3, the control device 51 includes a control unit 52 including a central processing unit (CPU), and a storage unit 53 including a read only memory (ROM) and a random access memory (RAM).

The control unit 52 includes a imaging controlling unit 58, a direction detection unit 62, a nail region detecting unit 59, a display controlling unit 60, a drawing controlling unit 61, a print controlling unit 63, and an image processing unit 64.

Functions of the imaging controlling unit 58, the direction detection unit 62, the nail region detecting unit 59, the display controlling unit 60, the drawing controlling unit 61, the print controlling unit 63, and the image processing unit 64 are realized by the CPU of the control unit 52 and a program stored in the ROM of the storage unit 53, the CPU and the program working together.

To the control device 51, an operating unit 31, the display unit 32, the image acquiring unit 46, the drawing unit 21, and the printing unit 24 are connected.

As illustrated in FIG. 4, in the inside of the main case 40, a finger placed part (object placing part) 45b on which the finger 12 inserted into the opening for finger insertion 45a is placed and fixed is provided.

The image acquiring unit 46 includes a camera 46a and a light source 46b placed above the nail 11 of the finger 12 fixed on the finger placed part 45b.

The camera 46a is to perform color-photographing of the finger 12 inserted into the opening for finger insertion 45a and the nail 11 thereof. As the camera 46a, for example, a camera having two million pixels or more can be used suitably.

The light source 46b is to light the nail 11 of the finger 12 during photographing by the camera 46a. As the light source 46b, a white LED or the like can be used suitably.

Figure 5A:
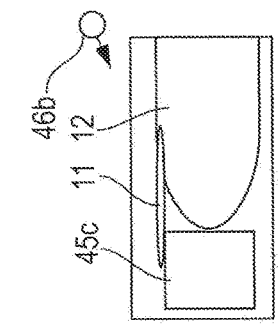
FIGS. 5A to 5F are views for describing an arrangement of a light source according to the embodiment, FIG. 5A being a side view illustrating a configuration in which a light source is arranged right above a nail, FIG. 5B being a view illustrating an image of a finger photographed from the above in FIG. 5A, FIG. 5C being a side view illustrating a configuration in which a light source is arranged on an obliquely upper side on a back side of a device with respect to a nail, FIG. 5D being a view illustrating an image of a finger photographed from the above in FIG. 5C, FIG. 5E being a side view illustrating a configuration in which a light source is arranged on an obliquely upper side on a front side of the device with respect to a nail, and FIG. 5F being a view illustrating an image of a finger photographed from the above in FIG. 5E.
Figure 5B:
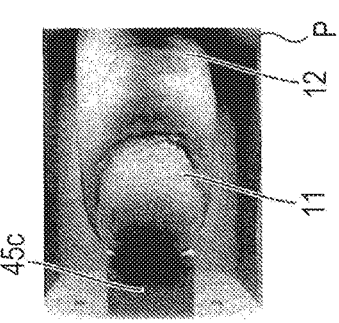

A position of arrangement of the light source 46b is not limited. For example, as illustrated in FIG. 5A, the light source 46b may be placed right above the nail 11. In this case, as illustrated in FIG. 5B, light is applied on the entire nail 11 in a relatively even manner Thus, a streaky pattern 11a (described later) can be checked easily.

Note that in each of FIGS. 5A to 5F, a configuration in which a tip of the nail 11 of the inserted finger 12 is placed on a nail placed table 45c is illustrated as an example.

Figure 5C:
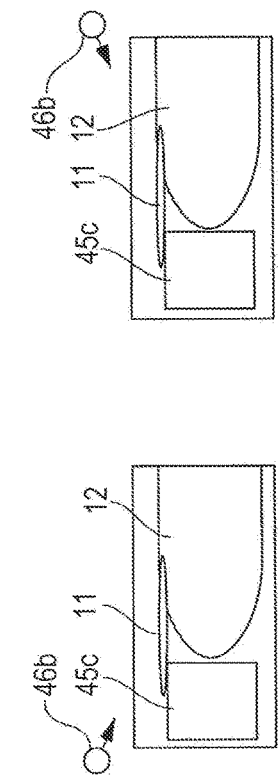
Figure 5D:
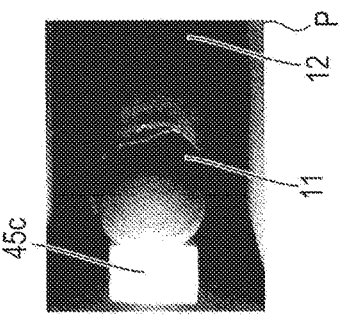

As illustrated in FIG. 5C and FIG. 5D, the light source 46b may be arranged on a back side of a device compared to the nail placed table 45c and the nail 11 may be lighted from the back side of a device toward an obliquely lower side.

Figure 5E:
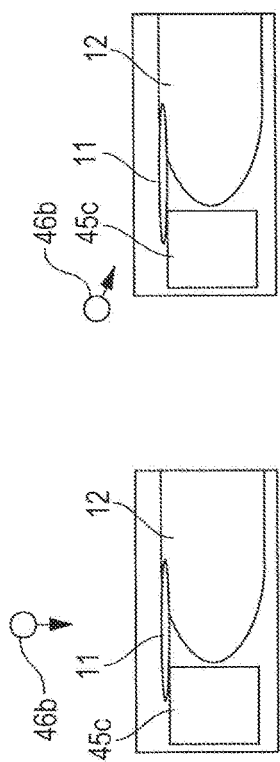
Figure 5F:
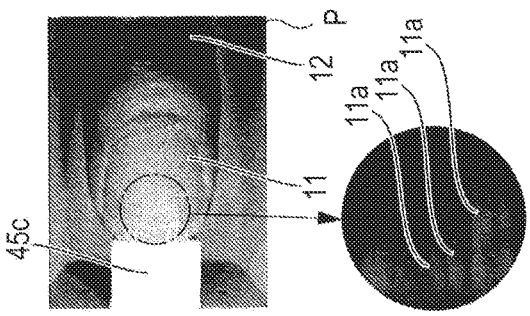

As illustrated in FIG. 5E and FIG. 5F, the light source 46b may be arranged on a front side of a device compared to the nail placed table 45c and the nail 11 may be lighted from the front side of a device toward an obliquely lower side.

As illustrated in FIG. 3, the drawing unit 21 includes a pen 22 and a moving unit 23 including a motor or the like to move the pen 22 on the nail 11.

For example, as the pen 22, a pen for a base which includes a white ink for a base inside and which can draw a base on the nail 11 with this ink when a nib touches the nail 11 is included.

The drawing unit 21 can be moved in a front/rear direction, a right/left direction, and an up/down direction (direction indicated by dashed arrow in FIG. 1) by the moving unit 23. With a nib of the pen 22 lowered to touch the surface of the nail 11, a base is drawn on the surface of the nail 11.

Note that the drawing unit 21 may include, as the pen 22, not only the pen for a base but also a pen for drawing which pen includes various colors and kinds of inks. Various designs may be drawn on the nail 11 with these pens.

The printing unit 24 includes an ink jet-type print head 25 and a moving unit 26 including a motor or the like to move the print head 25 and prints the nail design D in a region, on which the base is formed, in the nail 11 with the print head 25.

The printing unit 24 can be moved in a front/rear direction, a right/left direction, and an up/down direction (direction indicated by dashed arrows in FIG. 1) by the moving unit 26. The printing unit 24 prints an intended design on the surface of the nail 11 with the print head 25 lowered onto the surface of the nail 11.

Note that the moving unit 23 and the moving unit 26 are not necessarily provided separately. The moving unit 23 and the moving unit 26 may be integrated as a moving unit to move the drawing unit 21 and the printing unit 24 together in the front/rear direction, the right/left direction, and the up/down direction and a driving unit to move the pen 22 upward/downward may be provided in the drawing unit 21.

The imaging controlling unit 58 controls the camera 46a and the light source 46b of the image acquiring unit 46, photographs the finger 12, which is inserted into the opening for finger insertion 45a and placed on the finger placed part 45b (see FIG. 4), with the camera 46a, and acquires the image P (see FIG. 2) including the nail 11.

Based on the image of the nail 11 of the finger 12 which is inserted into the opening for finger insertion 45a and photographed with the camera 46a, the nail region detecting unit 59 detects the region of the nail 11 by image processing such as edge detection processing.

Next, a function of the direction detection unit 62 will be described.

Figure 6A:
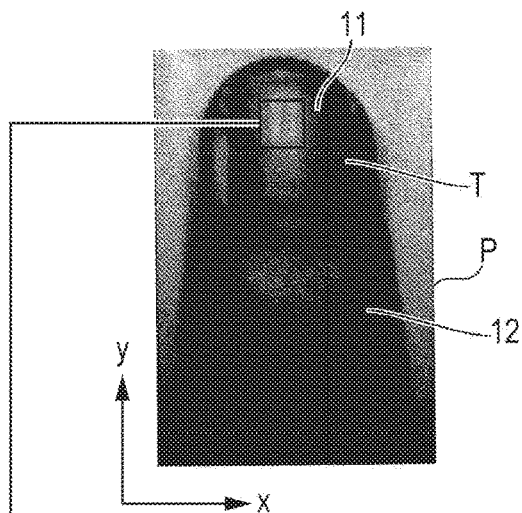
FIGS. 6A to 6D are views for describing a function of a direction detection unit according to the embodiment and are views illustrating images of when a finger is inserted straight, FIG. 6A being a view illustrating an acquired image, FIG. 6B being a view illustrating a part of an image extracted from FIG. 6A, FIG. 6C being a view illustrating an image on which conversion into a grayscale and enhancement processing are performed, and FIG. 6D being a view illustrating a power spectrum image acquired by two-dimensional Fourier transform of an image.
Figure 6B:
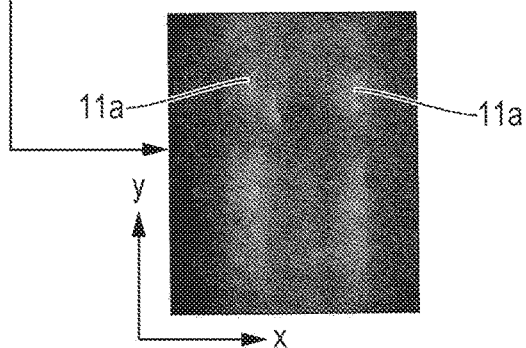

As illustrated in FIG. 6A and FIG. 6B, generally, a streaky pattern 11a naturally exists on a surface or a vicinity thereof of a nail 11 of a finger 12 of a person although there is a slight difference in appearance depending on age or gender. Here, it is assumed that this streaky pattern 11a does not include a stripe due to a scar on the surface of the nail 11 or a stripe generated due to an image formed on the surface of the nail 11 and that an object is the streaky pattern 11a naturally formed on the nail 11.

The direction detection unit 62 detects, as the streaky pattern 11a of the nail 11, a region in which brightness is relatively higher than that of a surrounding region and in which a region with relatively high brightness is extended as a streaky pattern in the image P.

As a result of observation on a plurality of subjects, the inventor of the present application finds that an extended direction of the streaky pattern 11a generally follows a longitudinal direction of the nail 11 and an extended direction of the finger 12.

By using the detected streaky pattern 11a, a longitudinal direction of the nail 11 and an extended direction of the finger 12 are specified.

Thus, the direction detection unit 62 has a function to detect a streaky pattern 11a of the nail 11 and to detect an extended direction of the streaky pattern 11a.

Note that in the image P, a vertical axis (in depth direction of device) is determined as a y-axis and a horizontal axis orthogonal to the y-axis is determined as an x-axis.

Figure 6C:
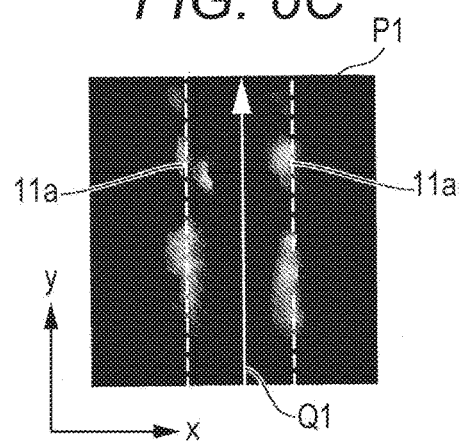

For example, as illustrated in FIG. 6C, the direction detection unit 62 converts a color image P in red (R), green (G), and blue (B) which image is acquired by the camera 46a into a grayscale with 256 tones in a prior stage of detection of the streaky pattern 11a in order to increase the speed of the image processing. Also, the direction detection unit 62 generates an image P1 which is the image P on which edge enhancement processing is performed in order to enhance the streaky pattern 11a on the nail 11.

Here, an edge is a place where brightness of an image varies greatly. The edge enhancement processing can be performed, for example, by adding a difference between gradation values of two adjoining pixels in an image to a gradation value of a focused pixel.

Then, based on brightness information acquired from the image P1 which is the image P on which the conversion into a grayscale and the edge enhancement processing are performed, the direction detection unit 62 detects the streaky pattern 11a (streaky pattern which appears along with white dashed line in FIG. 6C) of the nail 11. Then, it is possible to detect an extended direction by checking this streaky pattern 11a. More specifically, a direction in which regions with relatively high brightness values are almost serially extended in a linear manner in the region of the nail 11 in the image P1 can be detected as an extended direction Q1 of the streaky pattern 11a of the nail 11.

Here, for example, an "NTSC coefficients method" can be used for calculation of the brightness value.

The NTSC coefficients method is a method to weight a gradation value of each of pixels in red (R), green (G), and blue (B), to divide the values by three, and to perform conversion into a grayscale by averaging. The coefficient of the weighting (NTSC coefficients) is the same with a method of separating a brightness signal (brightness) which method is generally used in a telecast.

In a case where it is assumed that three gradation values of R, G, and B are arbitrary integer numbers among 0 to 255, a Y value (range of value is arbitrary integer number from 0 to 255) after conversion into a grayscale is calculated from Y=0.30R+0.59G+0.11B.

In the present embodiment, this Y value is a brightness value. Note that a method of calculating the brightness value is not specifically limited to this example and can be arbitrarily selected from various calculation methods.

Figure 6D:
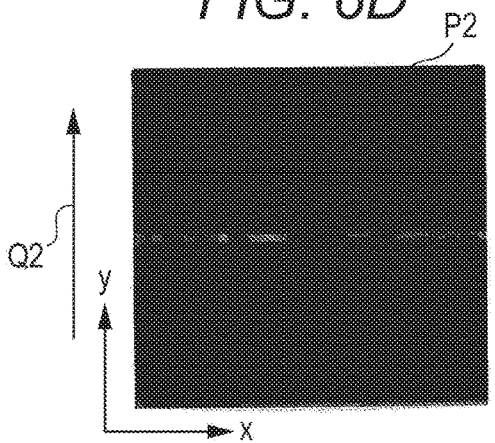

After converting the image P into the grayscale and performing the edge enhancement processing on the image, the direction detection unit 62 performs two-dimensional Fourier transform thereof. Then, as illustrated in FIG. 6D, the direction detection unit 62 can detect a characteristic of a transform source image from a power spectrum image P2 acquired by the two-dimensional Fourier transform and can detect an extended direction Q2 of the streaky pattern 11a of the nail 11.

That is, a direction in which a bright part is extended from a center toward the outside in the power spectrum image P2 indicates that there is a line (streaky pattern) corresponding to the direction. In the nail region T, the line corresponds to the streaky pattern 11a. Thus, it is possible to detect the extended direction Q2 of the streaky pattern 11a of the nail 11 from the direction in which the bright part is extended. More specifically, a direction orthogonal to the direction in which the bright part is extended is detected as the extended direction Q2 of the streaky pattern 11a of the nail 11.

Incidentally, in each of FIGS. 6A to 6D, a case where each of the extended directions Q1 and Q2 of the streaky pattern 11a of the nail 11 becomes substantially in parallel with the y-axis is illustrated as an example. However, as illustrated in FIG. 7A and FIG. 7B, there is a case where the longitudinal direction of the nail 11 is oblique with respect to (is not in parallel with) the y-axis.

In such a case, an inclination angle $\theta 1$ (see FIG. 7C) or an inclination angle $\theta 2$ (see FIG. 7D) of the extended direction Q1 or Q2 of the streaky pattern 11a of the nail 11 with respect to the y-axis is calculated.

Then, the nail design D is rotated for the inclination angle $\theta 1$ or $\theta 2$ and processing to adjust an axis y1 (see FIG. 2) in a direction of the nail design D to the extended direction Q1 or Q2 of the streaky pattern 11a of the nail 11.

With this algorithm, it is possible to calculate extended directions Q1 and Q2 of a streaky pattern 11a of each of various nails 11. However, for example, in a case where it is not possible to detect a streaky pattern 11a because of a faint streaky pattern 11a of the nail 11 or in a case where a difference between the calculated inclination angle $\theta 1$ or inclination angle $\theta 2$ and an extended direction of the finger 12 which extended direction is detected based on the image P is greater than a predetermined limit value and it is estimated that a value of the inclination angle $\theta 1$ or $\theta 2$ is not correct, a direction of the nail design D is adjusted based on the extended direction of the finger 12.

Moreover, the direction detection unit 62 compares the extended direction Q1 of the streaky pattern 11a detected based on the brightness information and the extended direction Q2 of the streaky pattern 11a calculated from the power spectrum image P2. In a case where a difference between the extended direction Q1 and the extended direction Q2 is within a predetermined acceptable error range, one of the extended directions Q1 and Q2 or an intermediate direction between the extended directions Q1 and Q2 is set as a final extended direction of the streaky pattern 11a of the nail 11.

On the other hand, in a case where a difference between the extended direction Q1 and the extended direction Q2 is greater than the predetermined acceptable error range, one of the extended directions Q1 and Q2 which is closer to the extended direction of the finger 12 can be determined as an the final extended direction of the streaky pattern 11a of the nail 11.

The display controlling unit 60 can control the display unit 32 and can display various screens on the display unit 32.

For example, the display controlling unit 60 displays various display screens of the design selection part 32b, the design confirmation part 32a, the image P, or the like and various buttons such as the print button 32d, the image acquiring button 32e, and the detection starting button 32f onto the display unit 32.

The drawing controlling unit 61 controls an operation of the pen 22 through the moving unit 23 and draws a white base on the nail 11 with the pen 22. The print controlling unit 63 controls the operation of the print head 25 through the moving unit 26 and prints the nail design D on the nail 11 with the print head 25.

According to a size of the nail region T in the image P, the image processing unit 64 reduces or enlarges the nail design D selected by a user and generates drawing data.

As described above, the image processing unit 64 also performs processing to adjust the axis y1 (see FIG. 2) in the vertical direction of the nail design D to the extended direction of the streaky pattern 11a which direction is determined by the direction detection unit 62.

The storage unit 53 stores various programs or various kinds of data to operate the drawing device 10. In the ROM of the storage unit 53, various programs such as an operation controlling program to acquire the image P of the finger 12 having the nail 11, to detect the streaky pattern 11a of the nail 11 based on the image P, and to realize drawing of the nail design D on the nail 11 with the direction of the nail design D adjusted to the extended direction of the streaky pattern 11a are stored.

When these programs are executed by the control device 51, units of the drawing device 10 are integrally controlled.

In the storage unit 53, a unit of storing an amount of a characteristic in a nail region 55 to store the amount of a characteristic of the nail 11, a nail shape storage unit 56 to store a shape of the nail 11 suitable to the nail design D, and a nail design storage unit 57 to store a plurality of nail designs D are provided.

Operation in Embodiment

Then, an operation controlling method of the drawing device 10 will be described with reference to FIG. 8 to FIG. 12.

FIG. 8 is a flowchart for describing a first example of the operation controlling method.

FIG. 9A is a plane view of a design. FIG. 9B is a view illustrating an image of in a case where a nail is inserted obliquely. FIG. 9C is a view illustrating a state in which a design is inclined according to an extended direction of a streaky pattern.

Figure 10:
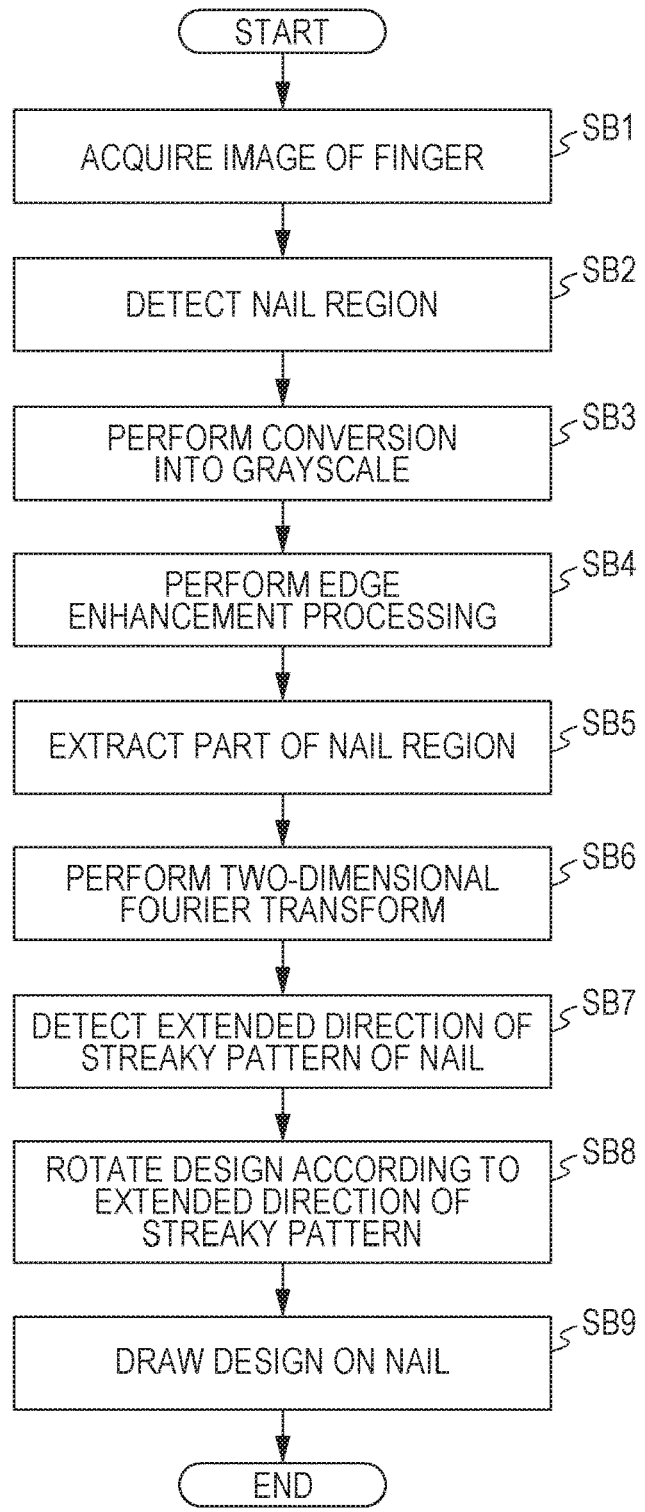
FIG. 10 is a flowchart of a second example of the operation controlling method according to the embodiment.

FIG. 10 is a flowchart for describing a second example of the operation controlling method.

Figure 11:
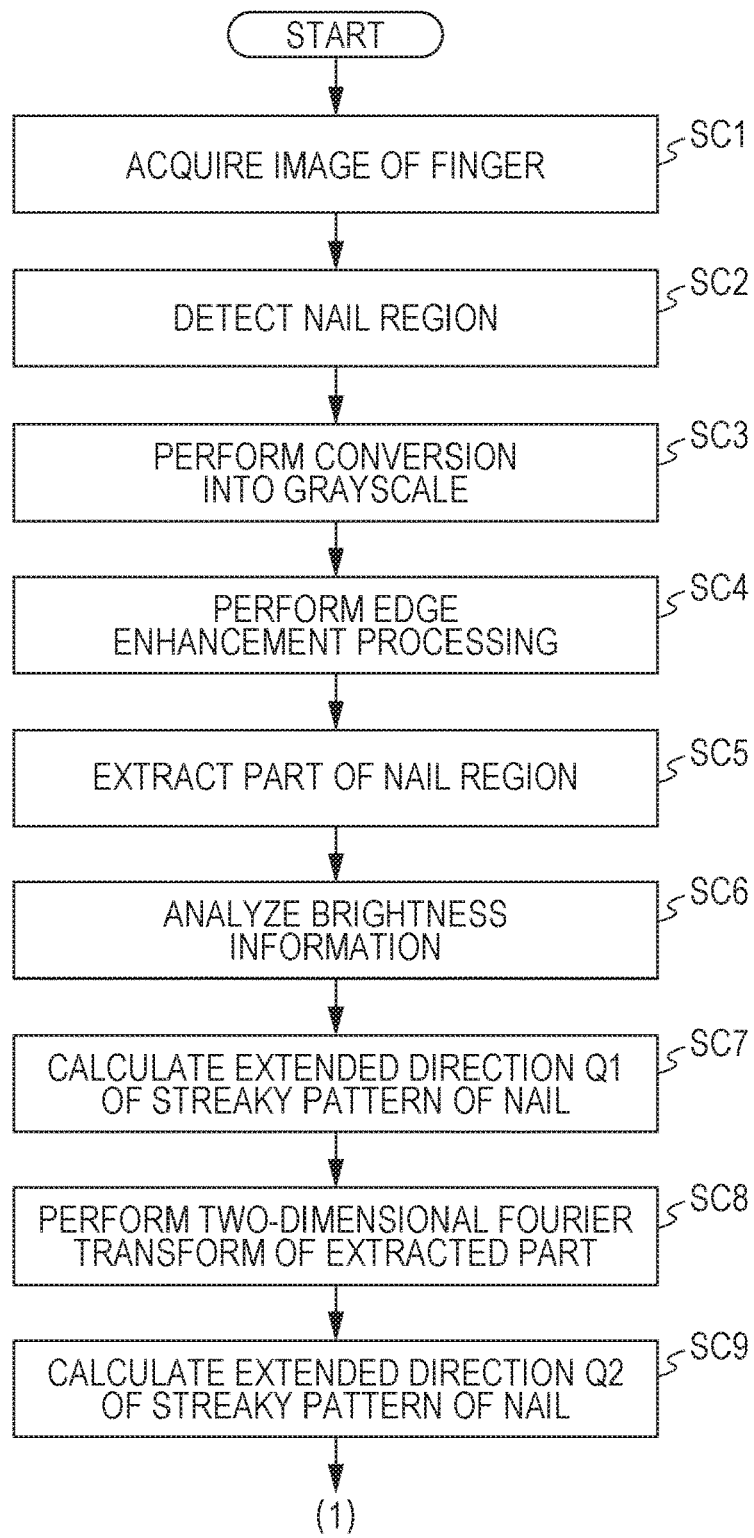
FIG. 11 is a flowchart of a third example of the operation controlling method according to the embodiment.
Figure 12:
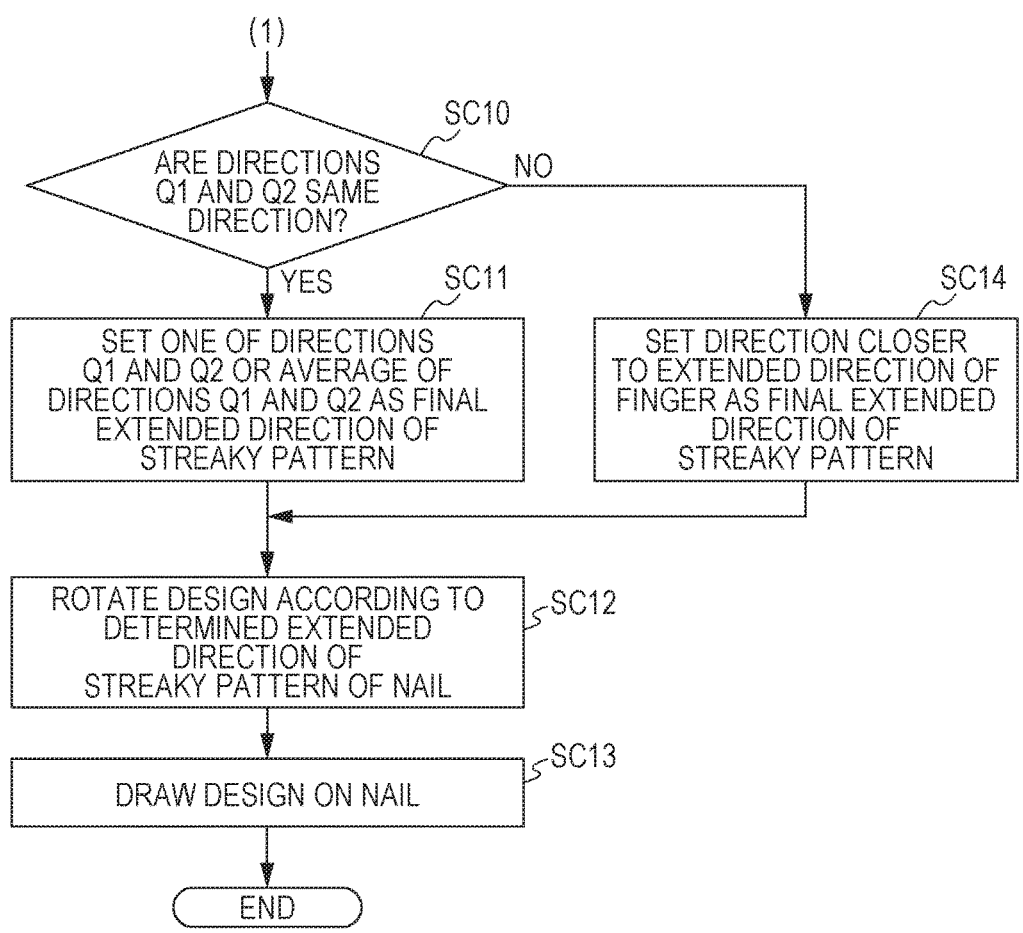
FIG. 12 is a flowchart continued from the flowchart illustrated in FIG. 11.

FIG. 11 and FIG. 12 are flowcharts for describing a third example of the operation controlling method.

In the first example of the operation controlling method, as illustrated in FIG. 8, first, the imaging controlling unit 58 turns on the light source 46b, photographs the finger 12 with the camera 46a, and acquires the image P of the finger 12 when a user presses the image acquiring button 32e in step SA1.

Then, the nail region detecting unit 59 detects the nail region T in the image P in step SA2 and extracts a part of the nail region T in step SA3.

The direction detection unit 62 checks the streaky pattern 11a of the nail 11 based on brightness information, which is acquired from a part of the nail region T, in step SA4 and detects the extended direction Q1 of the streaky pattern 11a in step SA5.

Here, for example, a direction in which regions with relatively high brightness values are almost serially extended in a linear manner in a region of the nail 11 in the image P1 (see FIG. 7C) which is the image P on which conversion into a grayscale and edge enhancement processing are performed is detected as the extended direction Q1 of the streaky pattern 11a of the nail 11.

Also, in step SA6, the axis y1 (see FIG. 2) in the vertical direction of the nail design D is adjusted to the extended direction Q1 of the streaky pattern 11a of the nail 11.

For example, the nail design D (see FIG. 9A) is superimposed and displayed on the image P and the nail design D is rotated for the inclination angle θ1 (see FIG. 7C).

Then, the axis y1 in the vertical direction of the nail design D is inclined (arrow (3) in FIG. 9C) in such a manner as to be adjusted to the detected extended direction Q1 of the streaky pattern 11a (extended direction of streaky pattern 11a of nail 11 which direction is indicated by arrow (2) in FIG. 9B) and the axis y1 in the vertical direction of the nail design D is adjusted to the extended direction Q1 of the streaky pattern 11a.

Then, in step SA7, the drawing unit 21 or the printing unit 24 draws the nail design D on the nail 11.

In the second example of the operation controlling method, as illustrated in FIG. 10, first, the imaging controlling unit 58 turns on the light source 46b, photographs the finger 12 with the camera 46a, and acquires the image P of the finger 12 when a user presses the image acquiring button 32e in step SB1.

Then, in step SB2, the nail region detecting unit 59 detects the nail region T in the image P.

Then, in step SB3, the image P is converted into a grayscale.

The edge enhancement processing is performed on the image P in step SB4 and a part of the nail region T is extracted in step SB5.

In step SB6, two-dimensional Fourier transform of the extracted part of the nail region T is performed.

Then, in step SB7, a characteristic of a transform source image is detected from the power spectrum image P2 (see FIG. 7D) acquired from the two-dimensional Fourier transform and the extended direction Q2 of the streaky pattern 11a of the nail 11 is detected.

Moreover, in step SB8, the axis y1 in the vertical direction of the nail design D is adjusted to the extended direction Q2 of the streaky pattern 11a of the nail 11.

For example, the nail design D (see FIG. 9A) is superimposed and displayed on the image P and the nail design D is rotated for the inclination angle θ2 (see FIG. 7D).

Then, the axis y1 in the vertical direction of the nail design D is inclined (arrow (3) in FIG. 9C) in such a manner as to be adjusted to the detected extended direction Q2 of the streaky pattern 11a (extended direction of streaky pattern 11a of nail 11 which direction is indicated by arrow (2) in FIG. 9B) and the axis y1 in the vertical direction of the nail design D is adjusted to the extended direction Q2 of the streaky pattern 11a.

Then, in step SB9, the drawing unit 21 or the printing unit 24 draws the nail design D on the nail 11.

In the third example of the operation controlling method, as illustrated in FIG. 11, first, the imaging controlling unit 58 turns on the light source 46b, photographs the finger 12 with the camera 46a, and acquires the image P of the finger 12 when a user presses the image acquiring button 32e in step SC1.

Then, in step SC2, the nail region detecting unit 59 detects the nail region T in the image P.

Then, in step SC3, the image P is converted into a grayscale.

The edge enhancement processing is performed on the image P in step SC4 and a part of the nail region T is extracted in step SC5.

In step SC6, the direction detection unit 62 checks the streaky pattern 11a of the nail 11 based on brightness information acquired from the extracted part of the nail region T.

Then, in step SC7, the extended direction Q1 of the streaky pattern 11a is detected.

For example, a direction in which regions with relatively high brightness values are almost serially extended in a linear manner in a region of the nail 11 in the image P1 (see FIG. 7C) which is the image P on which conversion into a grayscale and edge enhancement processing are performed is set as the extended direction Q1 of the streaky pattern 11a of the nail 11.

In step SC8, two-dimensional Fourier transform of the extracted part of the nail region T is performed.

Then, in step SC9, a characteristic of a transform source image is detected from a power spectrum image P2 (see FIG. 7D) acquired from the two-dimensional Fourier transform and the extended direction Q2 of the streaky pattern 11a of the nail 11 is detected.

As illustrated in FIG. 12, in step SC10, it is determined whether the calculated extended directions Q1 and Q2 of the streaky pattern 11a of the nail 11 are the same direction.

In a case where it is determined that the extended directions Q1 and Q2 of the streaky pattern 11a are the same direction, one of the extended directions Q1 and Q2 of the streaky pattern 11a of the nail 11 or an average of Q1 and Q2 is determined as the final extended direction of the streaky pattern 11a of the nail 11 in step SC11.

On the other hand, in step SC10, in a case where it is determined that the calculated extended directions Q1 and Q2 of the streaky pattern 11a are not the same direction, processing goes to step SC14 and one of the extended directions Q1 and Q2 of the streaky pattern 11a of the nail 11 which is closer to the extended direction of the finger 12 is determined as the final extended direction of the streaky pattern 11a of the nail 11.

Figure 13:
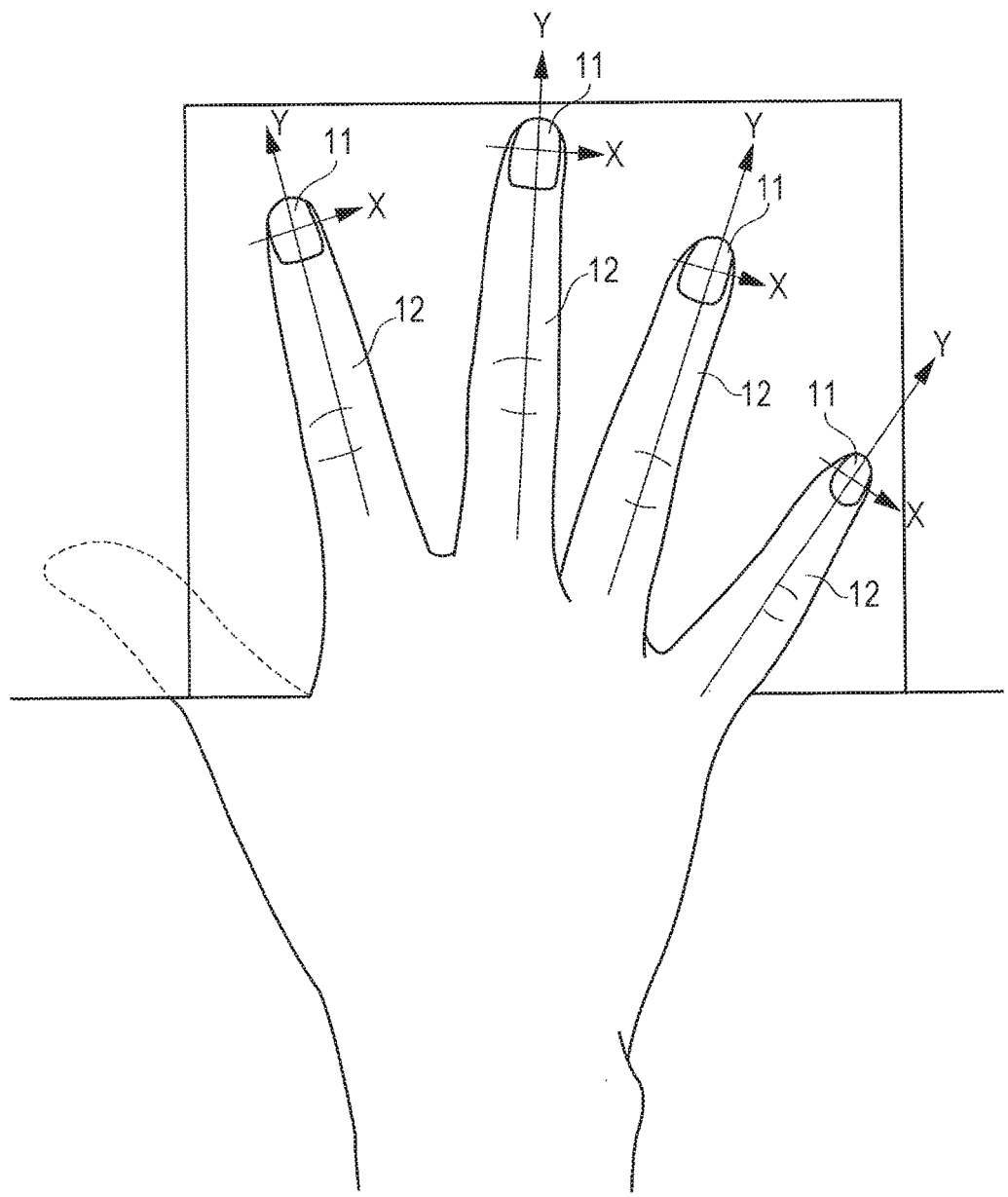
FIG. 13 is a view for describing a way of determining an extended direction of a finger according to the embodiment.

Here, as illustrated in FIG. 13, the extended direction of the finger 12 is determined as a longitudinal direction of the finger 12 (y-axis direction in drawing).

Note that an x-axis in FIG. 13 is a width direction of the finger 12 which direction is orthogonal to the extended direction of the finger 12.

In step SC12, the axis y1 in the vertical direction of the nail design D is adjusted to the finally-determined extended direction of the streaky pattern 11a of the nail 11.

For example, the nail design D (see FIG. 9A) is superimposed and displayed on the image P and the nail design D is rotated for the inclination angle θ1 or the inclination angle θ2.

Then, the axis y1 in the vertical direction of the nail design D is inclined (arrow (3) in FIG. 9C) in such a manner as to be adjusted to the determined extended direction of the streaky pattern 11a (extended direction of streaky pattern 11a of nail 11 which direction is indicated by arrow (2) in FIG. 9B) and the axis y1 in the vertical direction of the nail design D is adjusted to the determined extended direction of the streaky pattern 11a.

Then, in step SC13, the drawing unit 21 or the printing unit 24 draws the nail design D on the nail 11.

Effect of Embodiment

According to the embodiment described above, a drawing device 10 which can detect, even in a case where there is no image of an entire finger 12 or a hand, a longitudinal direction of a nail 11 correctly only with an image of the nail 11 and which can perform drawing on the nail 11 while adjusting a direction of a nail design D appropriately, an operation controlling method of the drawing device 10, and an operation controlling program of the drawing device 10 can be provided.

Note that in the embodiment, a configuration in which one finger 12 is inserted into the opening for finger insertion 45a has been described. On the other hand, in a configuration in which a plurality of fingers 12 can be simultaneously inserted into the opening for finger insertion 45a, directions of fingers 12 vary as illustrated in FIG. 13. In such a case, utilization of the drawing device 10 of the present embodiment is effective in drawing a nail design D on each nail 11 in an appropriate direction accurately.

In performance of the above-described two-dimensional Fourier transform, when the number of pixels is a power of 2 in a case of extracting a region, on which calculation is to be performed, from a part of the nail 11 in the image P illustrated in each of FIGS. 6A to 6D, calculation by fast Fourier transform algorithm with which calculation of Fourier transform can be performed at high speed can be performed. Thus, extraction of the region on which two-dimensional Fourier transform is to be performed is preferably performed in such a manner that the number of pixels becomes a power of 2.

What is claimed is:

1. A drawing device comprising:
an object placing part on which an object is placed, the object being a finger or a toe having a nail;
a nail design forming unit configured to form a design on the nail; and
a control unit,
wherein the control unit includes:
a direction detection unit configured to detect an extended direction of a streaky pattern which is naturally-existing on the nail based on an image including the nail of the object placed on the object placing part; and
an image processing unit configured to adjust a direction of a nail design based on the extended direction of the streaky pattern detected by the direction detection unit,
wherein the nail design forming unit forms the nail design which is adjusted by the image processing unit, as the design, on the nail.

2. The drawing device according to claim 1, wherein
the direction detection unit further detects an extended direction of the object based on the image, and
the image processing unit adjusts the direction of the nail design to the extended direction of the object in a case where the extended direction of the streaky pattern is not detected and the extended direction of the object is detected by the direction detection unit.

3. The drawing device according to claim 1, wherein
the direction detection unit detects an extended direction of the object based on the image, and
the image processing unit adjusts the direction of the nail design to the extended direction of the object in a case where the extended direction of the streaky pattern and the extended direction of the object are detected by the direction detection unit and a difference between the extended direction of the object and the extended direction of the streaky pattern is greater than a predetermined limit value.

4. The drawing device according to claim 1, wherein the direction detection unit detects a region, in which regions with relatively high brightness values serially exist in a linear manner, as the streaky pattern in the nail region in the image and detects, as the extended direction of the streaky pattern, a direction in which the regions with relatively high brightness values are extended in the linear manner in the streaky pattern.

5. The drawing device according to claim 1, wherein the direction detection unit converts the image into a grayscale, performs two-dimensional Fourier transform of the image which is converted into the grayscale, and detects the extended direction of the streaky pattern from a power spectrum image acquired from the two-dimensional Fourier transform.

6. The drawing device according to claim 1, wherein
the direction detection unit detects the extended direction of the object,
detects a region, in which regions with relatively high brightness values serially exist in a linear manner, as the streaky pattern in the nail region in the image,
detects a direction in which the regions with relatively high brightness values are extended in the linear manner in the streaky pattern as a first extended direction, converts the image into a grayscale and performs two-dimensional Fourier transform of the image which is converted into the grayscale,
detects a direction of the streaky pattern, which direction is calculated from a power spectrum image acquired by the two-dimensional Fourier transform, as a second extended direction,
compares the first extended direction with the second extended direction,
sets one of the first extended direction and the second extended direction or an intermediate direction between the first extended direction and the second extended direction as the extended direction of the streaky pattern in a case where a difference between the first extended direction and the second extended direction is within a predetermined acceptable error range, and
sets one of the first extended direction and the second extended direction, which is closer to the extended direction of the object, as the extended direction of the streaky pattern in a case where a difference between the first extended direction and the second extended direction is greater than the acceptable error range.

7. An operation controlling method of a drawing device, comprising:
a first detecting step of detecting an extended direction of a streaky pattern naturally-existing on a nail of an object which is placed on an object placing part, the object being a finger or a toe having the nail;
a first adjusting step of adjusting a direction of a nail design based on the extended direction of the streaky pattern detected in the first detecting step; and
a design forming step of forming the nail design which is adjusted in the first adjusting step on the nail.

8. The operation controlling method of a drawing device according to claim 7,
wherein the first detecting step further includes a step of detecting an extended direction of the object based on the image,
wherein the first adjusting step includes a second adjusting step of adjusting the direction of the nail design to the extended direction of the object in a case where the extended direction of the streaky pattern is not detected and the extended direction of the object is detected in the first detecting step.

9. The operation controlling method of a drawing device according to claim 7,
wherein the first detecting step further includes a step of detecting an extended direction of the object based on the image,
wherein the first adjusting step of adjusting the direction of the nail design includes a third adjusting step of adjusting the direction of the nail design to the extended direction of the object in a case where the extended direction of the streaky pattern and the extended direction of the object are detected in the first detecting step and a difference between the extended direction of the object and the extended direction of the streaky pattern is greater than a predetermined limit value.

10. The operation controlling method of a drawing device according to claim 7, wherein the first detecting step includes:
a first region detecting step of detecting, as the streaky pattern, a region in which regions with relatively high brightness values serially exist in a linear manner in the nail region in the image, and
a second detecting step of detecting, as the extended direction of the streaky pattern, a direction in which the regions with relatively high brightness values are extended in the linear manner in the streaky pattern.

11. The operation controlling method of a drawing device according to claim 7, wherein the first detecting step includes:
a first transforming step of converting the image into a grayscale and performing two-dimensional Fourier transform of the image converted into the grayscale, and
a third detecting step of detecting an extended direction of the streaky pattern from a power spectrum image acquired by the two-dimensional Fourier transform performed in the first transforming step.

12. The operation controlling method of a drawing device according to claim 7, wherein the first detecting step includes:
a forth detecting step of detecting an extended direction of the object based on the image,
a second region detecting step of detecting, as the streaky pattern, a region in which regions with relatively high brightness values serially exist in a linear manner in the nail region in the image,
a fifth detecting step of detecting, as a first extended direction, a direction in which the regions with relatively high brightness values are extended in the linear manner in the streaky pattern,
a second transforming step of converting the image into a grayscale, performing two-dimensional Fourier transform of the image converted into the grayscale,
a sixth detecting step of detecting, as a second extended direction, a direction of the streaky pattern which direction is calculated from a power spectrum image acquired by the two-dimensional Fourier transform performed in the second transforming step,
a comparing step of comparing the first extended direction with the second extended direction,
a first setting step of setting one of the first extended direction and the second extended direction or an intermediate direction between the first extended direction and the second extended direction as the extended direction of the streaky pattern in a case where a difference between the first extended direction and the second extended direction is within a predetermined acceptable error range, and
a second setting step of setting one of the first extended direction and the second extended direction, which is closer to the extended direction of the object, as the extended direction of the streaky pattern in a case where a difference between the first extended direction and the second extended direction is greater than the acceptable error range.

13. A non-transitory computer-readable recording medium recording an operation controlling program of a drawing device, the operation controlling program causing a computer:
to detect an extended direction of a streaky pattern naturally-existing on a nail of an object which is placed into an object placing part, the object being a finger or a toe having the nail, based on an image including the nail of the object acquired by an image acquiring unit,
to adjust a direction of a nail design based on the extended direction of the streaky pattern, and
to form the nail design which is adjusted on the nail with a nail design forming unit.

14. The non-transitory computer-readable recording medium according to claim 13, wherein in the operation controlling program, the operation of causing the computer to detect the extended direction of the streaky pattern includes:
an operation of causing the computer to detect, as the streaky pattern, a region in which regions with relatively high brightness values serially exist in a linear manner in the nail region in the image, and
an operation of causing the computer to detect, as the extended direction of the streaky pattern, a direction in which the regions with relatively high brightness values are extended in the linear manner in the streaky pattern.

15. The non-transitory computer-readable recording medium according to claim 13, wherein in the operation controlling program, the operation of causing the computer to detect the extended direction of the streaky pattern includes
an operation of causing the computer to convert the image into a grayscale,
an operation of causing the computer to perform two-dimensional Fourier transform of the image converted into the grayscale, and
an operation of causing the computer to detect an extended direction of the streaky pattern from a power spectrum image acquired from the two-dimensional Fourier transform.

16. The non-transitory computer-readable recording medium recording according to claim 13, wherein in the operation controlling program, the operation of causing the computer to detect the extended direction of the streaky pattern includes
an operation of causing the computer to detect an extended direction of the object based on the image,
an operation of causing the computer to detect, as the streaky pattern, a region in which regions with relatively high brightness values serially exist in a linear manner in the nail region in the image and to detect, as a first extended direction, a direction in which the regions with relatively high brightness values are extended in the linear manner in the streaky pattern,
an operation of causing the computer to convert the image into a grayscale, to perform two-dimensional Fourier transform of the image converted into the grayscale, and to detect, as a second extended direction, a direction of the streaky pattern which direction is calculated from a power spectrum image acquired by the two-dimensional Fourier transform,
an operation of causing the computer to compare the first extended direction with the second extended direction,
an operation of causing the computer to set one of the first extended direction and the second extended direction or an intermediate direction between the first extended direction and the second extended direction as the extended direction of the streaky pattern in a case where a difference between the first extended direction and the second extended direction is within a predetermined acceptable error range, and
an operation of causing the computer to set one of the first extended direction and the second extended direction, which is closer to the extended direction of the object, as the extended direction of the streaky pattern in a case where a difference between the first extended direction and the second extended direction is greater than the acceptable error range.

* * * * *